United States Patent Office 3,334,017
Patented Aug. 1, 1967

---

3,334,017
PHENYLALKYLHYDRAZINE COMPOSITIONS
John H. Biel, Milwaukee, Wis., assignor, by mesne assignments, to Colgate-Palmolive Company, New York, N.Y., a corporation of Delaware
No Drawing. Filed Dec. 15, 1958, Ser. No. 780,193
2 Claims. (Cl. 167—65)

This invention relates to hydrazine derivatives. More particularly, this invention is concerned with phenylalkylhydrazines and the use of these compounds as psychotherapeutic agents. The invention is also concerned with novel pharmaceutical compositions containing a phenylalkylhydrazine.

This application is a continuation-in-part of my copending applications Ser. No. 605,724, filed Aug. 23, 1956, now abandoned, and Ser. No. 716,876, filed Feb. 24, 1958, now abandoned.

It has been discovered, according to the present invention, that phenylalkylhydrazines have psychotherapeutic activity. The phenylalkylhydrazines which possess such activity, and are thus psychotherapeutic agents, have the formula:

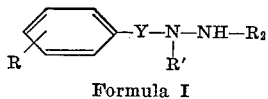

Formula I wherein R is hydrogen or one or more substituents on the phenyl group such as an alkyl group such as methyl, ethyl, propyl, butyl or the like, an alkoxy group such as methoxy, ethoxy, propoxy or the like, an aryl group such as the phenyl group, an aralkyl group and particularly a phenyl-alkyl group such as the benzyl group, a phenyl-alkoxy group such as phenylmethoxy and including the phenoxy group, the hydroxy group, polyalkoxy substituents such as dimethoxy and trimethoxy substituents, a lower alkylenedioxy group such as the methylenedioxy group, a halogen such as bromine or chlorine, and dihydroxy substituents, R' is hydrogen, an alkyl group such as methyl, ethyl, isopropyl and the like, cycloalkyl groups such as the cyclohexyl and cyclopentyl groups, hydroxyalkyl groups such as the hydroxyethyl group, or an aralkyl group such as phenethyl, phenylpropyl and phenylisopropyl in which the alkyl moiety has at least two carbons in a straight or direct line between the nitrogen and the phenyl group, and $R_2$ represents hydrogen, an alkyl group and particularly the lower alkyl groups such as methyl, ethyl, propyl, butyl, isopropyl, pentyl, hexyl and the like, a hydroxyalkyl group such as the ethylhydroxy group, an alkenyl group such as a lower alkenyl group and particularly the allyl group and the 1-(2-butenyl) group, an aryl group and particularly a monocyclic aryl group such as the phenyl group and nuclear substituted phenyl groups such as the hydroxyphenyl, methoxyphenyl, chlorophenyl and acetoxyphenyl groups, an aralykyl group and particularly one in which the aryl moiety is monocyclic and the alkyl moiety is a lower alkyl group of at least two carbons in a direct or straight line between the phenyl and hydrazine moieties such as phenethyl, phenylpropyl, phenylisopropyl and p-chlorophenylpropyl groups, a cycloalkyl group such as the cyclopentyl and cyclohexyl groups, an alkynyl group such as propynyl, butynyl and the like, the 2-thienylmethyl group and the pyridylmethyl group, and Y is a straight or branched alkylene group of at least two carbons in a direct or straight line between the phenyl and hydrazine groups and advisably of 12 or less carbons although it generally is of 5 or less carbons, such as the following:

(a) CH(CH$_3$)CH$_2$, 1-methylethylene
(b) CH$_2$CH$_2$CH$_2$, propylene
(c) CH$_2$CH(CH$_3$), 2-methylethylene
(d) CH(CH$_3$)CH$_2$CH$_2$, 1-methylpropylene
(e) CH$_2$CH(CH$_3$)CH$_2$, 2-methylpropylene
(f) CH$_2$CH$_2$CH(CH$_3$), 3-methylpropylene
(g) CH$_2$CH$_2$CH(CH$_3$)CH$_2$, 3-methylbutylene The compounds of Formula I are potent monoamine oxidase inhibitors and central nervous system stimulants useful for psychotherapeutic treatment of depressed mental states. Although I do not wish to be restricted to a theory, it is considered that these phenylalkylhydrazines pass through the blood-brain barrier and, because of their monoamine oxidase inhibitory property, retard or prevent the metabolic destruction of neurohumoral agents such as serotonin and norepinephrine. Serotonin and norepinephrine are present in the brain and apparently serve as chemical transmitters in, or stimulants of, the central nervous system. A deficiency of available serotonin or norepinephrine in the brain, such as can be caused by metabolism or degradation of these agents by monoamine oxidase, may result in parasympathetic predominance present in depressed mental states. By preventing or retarding destruction of serotonin and norepinephrine through the use of a phenylalkylhydrazine the levels of these neurohumoral agents present in the body are maintained higher for longer periods of time so that sympathetic characteristics such as increased awareness and motility result.

Humans diagnosed as endogenous, tension, involutional, reactive, agitated and cyclic depressives as well as patients afflicted with depression secondary to schizophrenia or neurotic reactions have responded satisfactorily to the administration of phenylisopropylhydrazine (N-(3-phenyl-2-propyl)hydrazine). Clinical improvement is characterized by elevation of mood, diminution of confusion, reduction in depressive attitudes and notable alertness.

Children with behavior patterns characterized by hyperactivity and irascibility have had excess motor activity quieted and were less asocial after being given phenylisopropylhydrazine.

In addition to phenylisopropylhydrazine, some other specific compounds which have been found to be exceptionally potent monoamine oxidase inhibitors are N-(3-p-methoxyphenyl-2-propyl)hydrazine, N-(3-o-methylphenyl-2-propyl)hydrazine, N-(3-m-chlorophenyl-2-propyl)hydrazine, N-[3-(3',4'-methylenedioxy)-phenyl-2-propyl]-hydrazine, N-(2-phenyl-1-propyl)-hydrazine and N-(4-phenyl-2-butyl)-hydrazine.

The most potent monoamine oxidase inhibitors of Formula I are those in which Y has no more than three carbons in a straight line between the phenyl and hydrazine moieties and in which R' is hydrogen. This does not mean that Y cannot have more than three compounds, for it can. The compound N-(4-phenyl-3-butyl)-hydrazine has four carbons in the chain but only three in a straight chain between the phenyl and hydrazine moieties, but nevertheless is a very potent compound. Although the compounds in which $R_2$ is a substituent are active, those compounds in which $R_2$ is hydrogen have higher activity.

In Table I following there is given in vitro and in vivo data on the monoamine oxidase inhibitory activity, as well as LD$_{50}$ values and analeptic data, for representative compounds of this invention.

The in vitro monoamine oxidase inhibition data was obtained using the procedure described by Horita in his publication in the J. Pharm. and Exper. Therap. 122, 176 (1958). In this test, homogenates of rat liver and brain were prepared, some of which were used as untreated controls while the compounds to be tested were added to other portions of the homogenates. The metabolism of serotonin (5-hydroxytryptamine) to 5-hydroxyindole acetic acid in both the controls and the treated homogenates was measured over a 30 minute period. The reduction in metabolism of serotonin in the treated homogenates compared to the controls is reported as the percent inhibition.

The in vivo monoamine oxidase inhibitory activity was determined using the procedure reported by Chessin et al. in the J. Pharm. and Exper. Therap. 119, 453 (1957). This test is based on the reversal effect which monoamine oxidase inhibitors have on reserpine treated animals. Normally an animal treated with reserpine shows a sedative effect. However, if pretreated with a monoamine oxidase inhibitor, the animal will show a pronounced stimulatory effect when administered reserpine. This is called reserpine reversal. In carrying out the test, the compound to be studied is injected at a threshold concentration into a series of mice at various doses intraperitoneally and two hours later 5 mg./kg. of reserpine is injected intraperitoneally. The lowest dose at which the animals show excitation is selected using iproniazid as 1. The higher the number the more active is the compound.

TABLE I

| | Compound ($\phi$=phenyl) | In Vitro, Percent Inhibition Concentration of Inhibitor | | In Vivo Activity Iproniazid=1 | $LD_{50}$, mg./kg. (S.C. mice) | Analeptic,[1] mg./kg. |
|---|---|---|---|---|---|---|
| | | $10^{-6}$ M | $10^{-5}$ M | | | |
| | Iproniazid | 0 | 25 | 1 | | |
| 1 | $\phi$—CH$_2$CH—NHNH$_2\cdot$HCl<br>$\quad\quad\;\;$ $\vert$<br>$\quad\quad\;\;$ CH$_3$ | 60 | 100 | 40 | 95 | 1.0 |
| 2 | $\phi$—CH$_2$CH$_2$—NHNH$_2\cdot$HCl | 30 | 50 | 4 | 102 | |
| 3 | $\phi$—CHCH$_2$—NHNH$_2\cdot$H$_3$PO$_4$<br>$\quad\;$ $\vert$<br>$\quad\;$ CH$_3$ | 25 | 80 | 16 | | |
| 4 | $\phi$—CH$_2$CH$_2$CH—NHNH$_2\cdot$H$_2$SO$_4$<br>$\quad\quad\quad\quad\;$ $\vert$<br>$\quad\quad\quad\quad\;$ CH$_3$ | 80 | 100 | 20 | | |
| 5 | CH$_3$O—$\phi$—CH$_2$CH(CH$_3$)—NHNH$_2\cdot$HCl | 10 | 100 | 8 | 118 | 10 |
| 6 | (CH$_3$O)$_2$—$\phi$—CH$_2$CH(CH$_3$)—NHNH$_2\cdot$H$_3$PO$_4$ | 15 | 65 | 4 | 130 | |
| 7 | (CH$_3$O)$_3$—$\phi$—CH$_2$CH(CH$_3$)—NHNH$_2\cdot$HCl | 5 | 50 | 2 | 100 | |
| 8 | methylenedioxy-$\phi$—CH$_2$CH(CH$_3$)—NHNH$_2\cdot$HCl | 55 | 100 | 20 | 100 | 15 |
| 9 | 2-CH$_3$-$\phi$—CH$_2$CH(CH$_3$)—NHNH$_2\cdot$HCl | 45 | 100 | 20 | 114 | 12 |
| 10 | (CH$_3$)$_2$CH-$\phi$—CH$_2$CH(CH$_3$)—NHNH$_2\cdot$H$_3$PO$_4$ | 25 | 95 | 4 | 108 | |
| 11 | 4-Cl-$\phi$—CH$_2$CH(CH$_3$)—NHNH$_2\cdot$H$_3$PO$_4$ | 49 | 100 | 20 | 84 | 3 |
| 12 | $\phi$—CH$_2$CH—NHNH—CH$_3\cdot$HCl<br>$\quad\quad\;\;$ $\vert$<br>$\quad\quad\;\;$ CH$_3$ | | | 3 | 126 | 10 |
| 13 | $\phi$—CH$_2$CH—NHNH—CHCH$_3\cdot$HCl<br>$\quad\quad\;\;$ $\vert$$\quad\quad\quad\quad\;\;$ $\vert$<br>$\quad\quad\;\;$ CH$_3\quad\quad\quad\;$ CH$_3$ | | | 2 | 269 | 50 |

See footnote at end of table.

TABLE I—Continued

| Compound (φ=phenyl) | In Vitro, Percent Inhibition Concentration of Inhibitor | | In Vivo Activity Iproniazid=1 | LD$_{50}$, mg./kg. (S.C. mice) | Analeptic,[1] mg./kg. |
| --- | --- | --- | --- | --- | --- |
| | 10$^{-6}$ M | 10$^{-5}$ M | | | |
| 14. φ—CH$_2$CH(CH$_3$)—NHNH—CH(CH$_3$)CH$_2$—φ | 0 | 12 | 2 | | |
| 15. CH$_3$O—C$_6$H$_4$—CH$_2$CH$_2$CH(CH$_3$)—NHNH$_2$ | 37 | 91 | | | |

[1] Arousal from reserpine stupor.

These phenylalkylhydrazines also stimulate the heart muscle and are thus useful for the treatment of a person in a state of shock.

These compounds are hypotensor agents when administered to humans and thus are useful in the treatment of hypertension. In the dog, however, they raise the blood pressure. The compound presently considered most useful as a hypotensor is phenylisopropylhydrazine administered as an acid addition salt.

Many of these compounds are many times more potent monoamine oxidase inhibitors than iproniazid. Phenylisopropylhydrazine is particularly active and, in addition, is faster acting in humans than iproniazid.

The compounds of this invention are useful for potentiating other therapeutic agents, such as phenothiazine tranquilizers like promazine and chlorpromazine. However, phenylisopropylhydrazine is an analeptic agent and arouses an animal from reserpine stupor (induced by prior administration of reserpine) as well as stupor from administered barbiturates. Nevertheless, if phenylisopropylhydrazine is administered first, followed by reserpine, a stimulating action results.

The compounds of Formula I which exert the described analeptic effect, i.e., which arouse animals from reserpine induced stupor, are apparently only those in which Y is an isopropyl group, i.e., those in which the hydrazine moiety is bonded to the middle, or second carbon, in the chain, and the phenyl group is on a carbon at the end of the isopropyl chain.

When phenylisopropylhydrazine is administered to an animal followed by a barbiturate, the sedative action of the barbiturate is potentiated.

The compounds of this invention are themselves potentiated by chlorothiazide so that a greater hypotensor activity is obtained, such as when phenylisopropylhydrazine is administered.

These compounds, particularly phenylisopropylhydrazine, are also useful in treating angina pectoris.

Phenylisopropylhydrazine is also useful as an antiarthritic agent.

Several methods of preparing the compounds of Formula I may be employed. In one method a suitable phenylalkylhalide is reacted with hydrazine or a monosubstituted hydrazine to form the corresponding phenylalkylhydrazine. This process may be represented as follows:

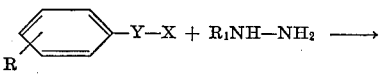

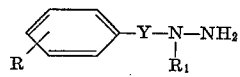

wherein X is a reactive halogen such as chlorine, bromine or iodine, and R, R$_1$ and Y have the significance previously assigned.

In addition to hydrazine hydrate, monosubstituted hydrazines such as methylhydrazine, ethylhydrazine, phenethylhydrazine, phenylhydrazine, propargylhydrazine, allylhydrazine, hydroxyethylhydrazine, p-chlorophenylpropylhydrazine, cyclohexylhydrazine, 2 - pyridylmethylhydrazine and the like may be used.

Phenylalkylhalides in which the alkyl moiety is ethyl or larger may be used in the process including phenylethylhalide, p-chlorophenylisopropylchloride, 4-(p-methoxyphenyl)-2-methylbutylchloride, 3,4 - methylenedioxyphenylethylchloride, phenyloctylchloride, p-phenoxyphenylpropylbromide, m-methylphenylhexylchloride and the like.

The reaction is effected by adding the phenylalkylhalide very slowly to a solution of a large excess (200%) of the hydrazine reactant in a solvent such as methanol, ethanol, butanol or dioxane. Increased temperatures such as up to reflux temperature are generally employed to increase the reaction rate. By distilling off the solvent, extracting the residue with a solvent such as ether and then fractionally distilling the extract, the desired reaction product may be recovered.

Representative of the products which are produced in this way are beta-phenylethylhydrazine, N-(3-phenyl-2-propyl)hydrazine, N-phenylhexyl - N - methyl hydrazine, N-(p-chlorophenylpropyl)-N-phenylisopropyl hydrazine, N-(3,4-methylenedioxyphenylethyl)-N-cyclohexyl hydrazine, N-phenyl ethyl-N-phenyl hydrazine, p-hydroxyphenylbutylhydrazine, N-phenylethyl-N-hydroxyethyl hydrazine and N-phenylpropyl-N-2-pyridylmethyl hydrazine.

The phenylalkylhydrazines may also be produced by the process which comprises reacting hydrazine or an N-substituted hydrazine with a phenylalkylaldehyde or a phenylalkyl-alkyl-ketone to form an intermediate hydrazone which is then reduced to the desired hydrazine. This process may be represented as follows:

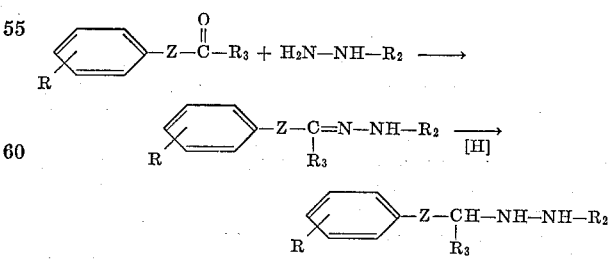

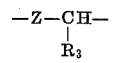

wherein R and R$_2$ have the significance previously assigned, Z is a lower alkylene group, R$_3$ is hydrogen or a lower alkyl group, and $$-Z-\underset{R_3}{CH}-$$

is equivalent to the significance assigned to Y previously.

Some of the phenylalkyl aldehydes and phenylalkyl ketones which may be used in this process are phenylethylaldehyde, phenylacetone, 2 - phenylpropionaldehyde, p-chlorophenylbutyraldehyde, 3,4-methylenedioxyphenylvaleraldehyde, phenylacetal, p-hydroxyphenylacetaldehyde, phenylethyl methyl ketone, phenylbutyl ethyl ketone, 2-phenylpropyl propyl ketone, phenylethyl ethyl ketone, 3,4-methylenedioxyphenylacetone, p-hydroxybenzyl methyl ketone, o-methylbenzyl methyl ketone, m-chlorobenzyl methyl ketone and m-propoxybenzyl ethyl ketone and the like.

In addition to hydrazine, monosubstituted hydrazines such as methylhydrazine, ethylhydrazine, propylhydrazine, phenylethylhydrazine, hydroxyethylhydrazine, p-hydroxyphenylhydrazine, propargylhydrazine, allylhydrazine, cyclohexylhydrazine, cyclohexylethylhydrazine, 2-thienylmethylhydrazine and 3 - pyridylmethylhydrazine may be used in the process.

Reaction between the phenylalkyl alkyl ketone or aldehyde and the hydrazine is conveniently effected by contacting the reactants in the presence of water or a lower alcohol. The reaction proceeds at room temperature although slightly elevated temperatures may be employed to increase the rate of reaction. Recovery of the intermediate phenylalkylidenyl hydrazine, or hydrazone, is conveniently effected by conventional methods. Thus, the product, generally an oil as the free base, may be salted out with an alkali metal hydroxide and extracted with a water immiscible organic solvent such as ether. The product is readily isolated by distillation under reduced pressure.

The intermediate hydrazone may be reduced to the corresponding hydrazine by chemical or catalytic reduction. Lithium aluminum hydride is the preferred chemical reducing agent. With lithium aluminum hydride, the reduction may be conveniently effected by intimately combining the reactants in an inert organic solvent such as anhydrous ether, dioxane, or tetrahydrofuran. Elevated temperatures such as the reflux temperature enhance the reaction. At reflux temperature, from 1 to 8 hours is usually sufficient to substantially complete the reaction. After the reaction is terminated, water may be added to the mixture to decompose excess lithium aluminum hydride. To recover the product, the organic phase is separated and the aqueous residue then may be combined, dried, and the product distilled.

Catalytic reduction may also be used satisfactorily using catalysts such as rhodium, platinum oxide, palladium and the like in solvents such as tetrahydrofuran, water, ethyl acetate and dioxan. Raney nickel is not a particularly suitable catalyst since undue cleavage occurs. Hydrogen pressures of about 50 to 3000 p.s.i. may be used. The temperature of reduction may be room temperature or increased temperatures such as up to 80° C.

For reducing the monosubstituted hydrazones, i.e., the phenylalkylhydrazones, it is advisable to use platinum or platinum oxide and conduct the reduction in a lower alcoholic solution containing a molar amount of acetic acid equal to the hydrazone to be reduced.

Some of the hydrazines produced in this way are phenylethylhydrazine, N-(3-phenyl - 2 - propyl)hydrazine, N-phenylpropyl-N'-ethyl hydrazine, N-phenylbutyl-N'-cyclohexylhydrazine, N-phenylhexyl - N' - phenylpropyl hydrazine, N-3,4-methylenedioxyphenylethyl-N'-propyl hydrazine, N-phenylethyl-N'-phenyl hydrazine, N-(3-phenyl-2-propyl) - N'-methyl hydrazine, sym.bis-N,N'-(phenylisopropyl)hydrazine, N - [3-(p-chlorophenyl)-2-propyl]-N'-methyl hydrazine, N-[4-(o-hydroxyphenyl)-2-butyl]-N'-ethyl hydrazine, N-(5-phenyl-3-amyl)-N'-phenylethyl hydrazine, N-(4-phenyl-2-butyl)-N'-ethyl hydrazine, N-(3-phenyl-2-propyl)-N'-allyl hydrazine and the like.

Hydrazines of Formula I in which R' is a lower alkyl or aralkyl group and R₂ is hydrogen may be conveniently produced by reacting an N-lower alkyl or aralkyl-N-(phenylalkyl)amine with nitrous acid to form the corresponding N - notroso - N - lower alkyl or aralkyl-N-(phenylalkyl)amine and reducing such compound to the corresponding hydrazine. This reaction may be represented as follows:

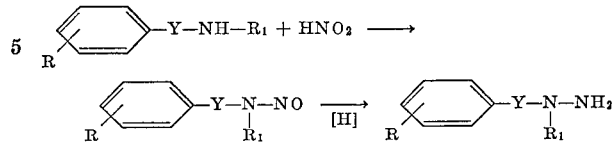

wherein $R_1$ is an alkyl or aralkyl group as previously specified and Y and R have the significance previously assigned.

Some of the N-lower alkyl or aralkyl-N-(phenylalkyl) amines which may be used in this process are N-methyl phenylisopropyl amine, N-ethyl p-hydroxyphenylisopropylamine, N - propyl 3,4 - methylenedioxyphenylisopropylamine, N - benzyl o - methoxyphenylbutylamine, N - phenethyl - N - (3 - phenylbutyl)amine and N-propyl-N-(2-phenylamyl)amine.

The nitrosation reaction may be readily effected by contacting the N-lower alkyl or aralkyl-N-(phenylalkyl) amine and nitrous acid under aqueous conditions at room temperature or moderately reduced temperatures. By extracting the reaction mixture with an immiscible solvent followed by evaporation of the solvent the nitroso intermediate may be recovered. It may be purified by fractional distillation.

Reduction of the nitroso compound to the corresponding hydrazine may be conveniently achieved by chemical or catalytic methods such as described hereinabove. Representative compounds formed in this manner are N-amino - N - methyl phenylisopropylamine, N - amino-N - ethyl p - methoxyphenylhexylamine, N - amino-N-benzyl p - hydroxyphenylethylamine, N - amino - N-propyl - 3,4 - methylenedioxyphenylisopropylamine, N-amino - N - methyl - N - (2 - phenylbutyl)amine and N-amino-N-ethyl-N-(3-phenylamyl)amine.

The described hydrazines are advisably employed in the described uses in the form of nontoxic acid addition salts such as the hydrochloride, hydrobromide, fumarate, phosphate and sulfate.

The phenylalkylhydrazines may be administered to animals and humans as pure compounds. It is advisable, however, to first combine one or more of the novel compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc, mannitol and the like may be used to form powders. Mannitol is the preferred solid carrier. The powders may be used as such for direct administration to a patient or, instead, the powders may be added to suitable foods and liquids, including water, to facilitate administration.

The powders also may be used to make tablets, or to fill gelatin capsules. Suitable lubricants like magnesium stearate, binders such as gelatin, and disintegrating agents like sodium carbonate in combination with citric acid may be used to form the tablets.

Unit dosage forms such as tablets and capsules may contain any suitable predetermined amount of one or more of the phenylalkylhydrazines, advisably as a nontoxic acid addition salt, and may be administered one or more at a time at regular intervals. Such unit dosage forms, however, should generally contain a concentration of 0.1% to 10% by weight of one or more of the active hydrazines.

A typical tablet may have the composition:

| | Mg. |
|---|---|
| 1. N-(3-phenyl-2-propyl)-hydrazine HCl | 12.5 |
| 2. Mannitol | 100 |
| 3. Stearic acid | 3 |

A granulation is made from the mannitol. The other ingredients are added to the dry granulation and then the tablets are punched.

Another tablet may have the composition:

|   | Mg. |
|---|---|
| 1. 2-phenylpropylhydrazine HCl | 10 |
| 2. Starch U.S.P. | 57 |
| 3. Lactose U.S.P. | 73 |
| 4. Talc U.S.P. | 9 |
| 5. Stearic acid | 6 |

Powders 1, 2 and 3 are slugged, then granulated, mixed with 4 and 5, and tableted.

Capsules may be prepared by filling No. 3 hard gelatin capsules with the following ingredients, thoroughly mixed:

|   | Mg. |
|---|---|
| 1. N-methyl-N'-(3-phenyl-2-propyl)-hydrazine HCl | .5 |
| 2. Lactose U.S.P. | 200 |
| 3. Starch U.S.P. | 16 |
| 4. Talc U.S.P. | 8 |

The oral route is preferred for administering the active phenylalkylhydrazines.

Dosages of from about 1 mg. to 50 mg. may be administered to obtain the stated activities. However, the recommended dosages are from 3 to 12 mg. daily. Larger dosages may be administered on an interrupted schedule but generally not more than 50 mg., and preferably not more than 25 mg., is administered daily.

According to a further embodiment of this invention, one or more of the phenylalkylhydrazines is administered simultaneously with, or concomitantly to, the administration of either tryptophan and/or phenylalanine to an animal or human. Tryptophan passes the blood-brain barrier and is converted in the brain to serotonin. Serotonin is not administered directly since it cannot pass the blood-brain barrier. Similarly, phenylalanine passes the blood-brain barrier and is converted in the brain to norepinephrine. Norepinephrine itself will not pass the blood-brain barrier so it is not given directly.

In place of tryptophan and phenylalanine one may use 5-hydroxytryptophan and 3,4-dihydroxy phenylalanine since the body first converts the amino acids to these respective hydroxyl derivatives.

By the administration of an active phenylalkylhydrazine simultaneously with, or concomitantly to, either tryptophan or phenylalanine, the monoamine oxidase inhibitory property of the hydrazine retards or prevents the degradation of serotonin and/or norepinephrine which are produced in the brain from the said amino acids. The serotonin and norepinephrine levels are thus not only raised but are maintained at the increased level by the described treatment.

Any suitable amounts of tryptophan (or 5-hydroxytryptophan) and/or phenylalanine (or 3,4-dihydroxy phenylalanine) may be administered since these materials are nontoxic. One or both of these materials is advisably combined with one or more of the active phenylalkylhydrazines into suitable pharmaceutical formulations.

According to another embodiment of the invention, reserpine can be administered simultaneously with, concomitantly to, or subsequent to, the administration of the phenylalkylhadrazine to obtain an added stimulatory effect as is evidenced by the reserpine reversal of the in vivo test referred to herein previously.

The following examples illustrate methods of making the compounds.

*Example 1.—Beta-phenethylhydrazine*

To a refluxing solution containing 147.5 g. of 85% hydrazine hydrate in 500 cc. of ethanol was added, during a period of 5 hours, 92.5 g. of phenethylbromide (0.50 mole) in 150 cc. of ethanol. Stirring and refluxing were continued for two hours. The ethanol was removed by distillation and the residue extracted repeatedly with ether. The ether was dried with potassium carbonate and the product collected by distillation, B.P. 74° C./0.1 mm., yield 52.3 g. (77%); $N_D^{20}$ 1.5494.

Analysis calcd. for $C_8H_{12}N_2$: N, 20.57. Found: N, 20.85.

*Example 2.—Phenethyl hydrazine hydrochloride*

The salt was prepared in ethanol by the addition of ethereal hydrochloric acid to the base, M.P. 167° C.

Analysis calcd. for $C_8H_{13}ClN_2$: Cl, 20.53. Found: Cl, 20.71.

*Example 3.—2-phenylpropylidenyl hydrazine*

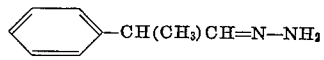

100.5 g. (0.75 mole) of 2-phenylpropionaldehyde was added during a period of 2 hours to 132.5 g. of 85% hydrazine hydrate at room temperature in 500 cc. methanol. After standing at room temperature for two hours, the methanol was removed and water was added to the residue. The aqueous mixture was saturated with potassium hydroxide and extracted with ether. The product was collected by distillation at 83° C./0.08 mm., yield 100 g. (90%); $N_D^{20}$ 1.5610.

Analysis calcd. for $C_9H_{12}N_2$: N, 9.45. Found: N, 8.88.

*Example 4.—1-hydrazino-2-phenylpropane*

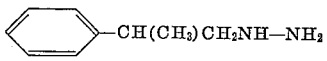

The hydrazone described in Example 3 was reduced by dissolving 59.3 g. (0.40 M) of it in 200 cc. of ethanol, neutralizing the solution with 24 g. of acetic acid and subjecting it to hydrogenation at 60 lbs. p.s.i. of hydrogen at room temperature in the presence of 0.8 g. of platinum oxide. The product was collected by distillation in vacuo, B.P. 70° C. (0.1 mm.); $N_D^{20}$ 1.5417.

Analysis calcd. for $C_9H_{14}N_2$: N, 18.65. Found: N, 17.57.

The diacid phosphate salt was prepared in ethanol, M.P. sinters at 117° C.

Analysis calcd. for $C_9H_{17}N_2PO_4$: $PO_4^=$, 39.48. Found: $PO_4^=$, 39.21.

*Example 5.—N-(3-phenyl-2-propyl)hydrazine*

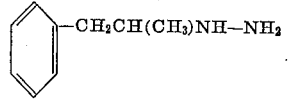

To 106 g. of 85% aqueous $N_2H_4$—$H_2O$ (1.8 mole) in 500 cc. of methanol was added 120.8 g. (0.90 mole) of phenylacetone with stirring and cooling, keeping the temperature between 15–20° C. The mixture was stirred for four hours at room temperature. The methanol was removed by distillation and the residue dissolved in 400 cc. of ether. The ether solution was dried with potassium carbonate and the ether removed by distillation. One-hundred gms. of the residue was dissolved in 300 cc. of ethanol and hydrogenated in the presence of 40 g. of acetic acid and 1.0 g. of platinum oxide catalyst at room temperature and a pressure of 60 lbs. $H_2$. The solution was clarified by filtration, the solvent distilled, the residue dissolved in water, the aqueous solution saturated with solid potassium hydroxide and the alkaline mixture extracted repeatedly with ether. The product was collected by distillation at 70° C. (0.02 mm.); $N_D^{20}$ 1.5373; yield 53 g. (46%).

Analysis calcd. for $C_9H_{14}N_2$: N, 18.66. Found: N, 18.54.

Example 6.—*N-(3-phenyl-2-propyl)-hydrazine hydrochloride*

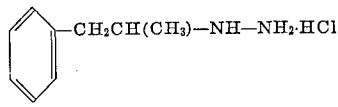

The base of Example 5 was neutralized with ethereal hydrochloric acid in 1:1 ether-isopropyl alcohol solution and the precipitate collected by filtration; M.P. 115–116° C.

Analysis calcd. for $C_9H_{15}ClN_2$: Cl, 19.03. Found: Cl, 19.00.

Example 7.—*N-methyl-N'-(3-phenyl-2-propylidenyl)-hydrazine*

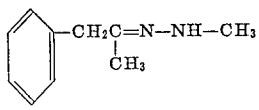

To 48 g. of mono-methylhydrazine sulfate in 325 cc. of water was added 40.1 g. of 28% ammonium hydroxide and then 40.2 g. of methyl benzylketone in 300 cc. of methanol keeping the temperature at 30–35° C. The pH of the reaction mixture was adjusted to 6 with acetic acid. Methanol was then removed by distillation, the residue dissolved in water, the aqueous solution saturated with solid potassium hydroxide, the alkaline mixture extracted with ether and the extracts dried with potassium carbonate. The product was collected at 83° C. (1.0 mm.); yield 21 g. (43%); $N_D^{20}$ 1.5442.

Analysis calcd. for $C_{10}H_{14}N_2$: N, 17.26. Found: N, 16.98.

Example 8.—*N-methyl-N'-(3-phenyl-2-propyl)-hydrazine and its hydrochloride*

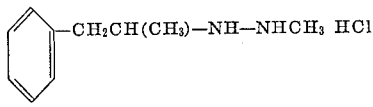

A mixture containing 20.5 g. of the propylidene derivative of Example 7, 7.5 g. of glacial acetic acid, 75 cc. of ethanol and 0.3 g. of platinum oxide catalyst was subjected to hydrogenation at 60 lbs. p.s.i. and room temperature. The catalyst was removed by filtration, the solvent distilled off and the residue dissolved in water. A saturated aqueous potassium hydroxide solution was added to the residue and the mixture extracted with ether. The ether extracts were dried with potassium carbonate and the product collected by distillation; B.P. 78° C. (1 mm.); yield 14.9 g. (71%); $N_D^{20}$ 1.5205.

Analysis calcd. for $C_{10}H_{16}N_2$: N, 17.06. Found: N, 16.86.

To 18 g. of the base dissolved in an ether-isopropyl alcohol solution (8:3) was added ethereal hydrochloric acid. The precipitate was collected by filtration, yield 1.6 g., M.P. 115–117° C.

Analysis calcd. for $C_{10}H_{17}ClN_2$: Cl, 17.66. Found: Cl, 17.99.

Example 9.—*N-nitroso-N-(3-phenyl-2-propyl)-methylamine*

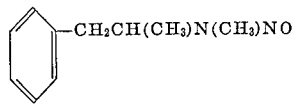

To 92.8 g. (0.44 mole) of N-methyl phenylisopropylamine hydrochloride in 100 cc. of water and 26 cc. (0.54 mole) of conc. hydrochloric acid cooled to 5–10° C. was added slowly a solution of 85 g. (1.2 mole) of sodium nitrite in 150 cc. of water, so as to maintain the reaction at 5–10° C. After extraction of the reaction mixture with ether and removal of the solvent the product was fractionated, B.P. 115–116° C. (0.8 mm.), yield 77.3 g. (87%).

Example 10.—*N-amino-N-methyl phenylisopropylamine*

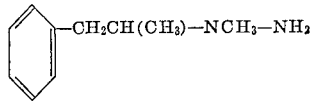

To 10.6 g. (0.28 mole) of lithium aluminum hydride in 500 cc. of anhydrous ether was added 35.7 g. (0.20 mole) of the nitroso compound of Example 9. The mixture was refluxed for 6 hours and the complex decomposed by the addition of 82 cc. of 40% potassium hydroxide. The ether layer was decanted and the solids washed repeatedly with ether. The ethereal extracts and washing were dried with potassium carbonate and the product collected by fractional distillation; B.P. 68–71° C. (0.45–0.60 mm.), yield 27.2 g. (83%).

Analysis calcd. for $C_{10}H_{16}N_2$: N, 8.53. Found: N, 8.35.

Example 11.—*3,4-methylenedioxyphenylisopropyl-hydrazine*

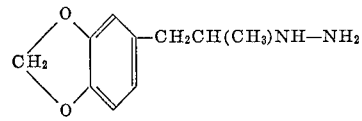

To 29.5 g. (0.50 mole) of 85% hydrazine hydrate in 150 cc. of methanol was added, during one hour at 5–10° C., 44.5 g. (0.25 mole) of 3,4-methylenedioxyphenylacetone. The solution was stirred for 2.5 hours. The methanol was removed by distillation. To the residue was added 150 cc. of absolute ethyl alcohol and 15 g. (0.25 mole) of glacial acetic acid and 500 mg. of platinum oxide and the mixture subjected to hydrogenation at 60 lbs. of hydrogen and room temperature. The catalyst was removed by filtration and the product recovered by fractional distillation, yield 31.9 g. (66%); B.P. 130° C./0.6 mm.

Analysis calcd. for $C_{10}H_{14}N_2O_2$: N, 7.22. Found: N, 6.84.

Example 12.—*Sym. -bis-N,N'-(phenylisoipropyl)-hydrazine*

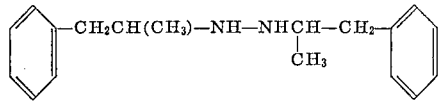

To 106 g. (1.8 mole) of 85% hydrazine hydrate in 500 cc. of methanol was added 120.6 g. of phenylacetone with stirring. The solution was stirred for 1 hour at room temperature and then refluxed for 15 minutes. The methanol was removed by distillation and the residue extracted with ether. The ether was removed by distillation, the residue dissolved in a mixture of 150 cc. of ethanol and 54 g. of glacial acetic acid and subjected to hydrogenation in the presence of 600 mg. $PtO_2$ at 60 lbs. of hydrogen and at room temperature. After removal of the catalyst by filtration the product was collected at 140° C. (0.02 mm.); yield 43.0 g. (35.6%).

Analysis calcd. for $C_{18}H_{24}N_2$: Titratable N, 5.22. Found: Titratable N, 5.26.

Example 13.—*N-(1-phenyl-2-propyl)-N'-isopropylidenyl hydrazine*

To 53.4 g. of actone (0.92 mole) was added 34.7 g. of 1-methyl-2-phenyl ethyl hydrazine (0.23 mole). An exothermic reaction occurred. The solution was refluxed for two hours, and the excess acetone distilled off through an 8″ column. The residue was subjected to vacuum distillation through a 5″ column. The liquid distilling at 74–76° C./0.05 mm. was collected as the desired compound; yield 41 g. (91%), $N^{20}_D$ 1.5224.

Analysis calcd. for $C_{12}H_{18}N_2$: N, 14.73. Found: N, 13.86.

*Example 14.—N-(1-phenyl-2-propyl)-N'-isopropyl hydrazine*

To a solution of 22.2 g. of N-(phenylisopropyl)-N'-isopropylidenyl hydrazine (0.117 mole) in 70 cc. of ethanol was added 7.0 g. of acetic acid (0.117 mole). The solution was reduced in the Parr apparatus in the presence of 0.18 g. of platinum oxide catalyst; in about ¾ hour the theoretical amount of hydrogen had been absorbed and further uptake of hydrogen ceased. The catalyst was removed by filtration and the filtrate was concentrated under vacuum. The syrupy residue was dissolved in 100 cc. of water, and, with cooling, the solution was saturated with potassium hydroxide. The alkaline mixture was extracted 3 times with 55 cc. portions of ether. The ethereal extracts were dried over potassium carbonate, and the ether distilled off through a 14" column. The ethereal residue was subjected to vacuum distillation through a 5" column. The liquid, B.P. 120–122° C./13 mm., was collected as product; yield, 65 g. (76%), $N^{20}_D$ 1.5022.

Analysis calcd. for $C_{12}H_{20}N_2$: N, 14.57. Found: N, 13.98. The hydrochloride salt melted at 149–150° C.

Analysis calcd. for $C_{12}H_{21}ClN_2$: Cl, 15.54. Found: Cl, 15.53.

*Example 15.—Benzylacetone hydrazone*

A solution of 49.3 g. of benzylacetone (0.33 mole) in 100 ml. of methanol was added in 3 hours with stirring to a refluxing solution of 59 g. of hydrazine hydrate (85%) in 175 ml. of methanol. The solution was stirred for 2 more hours and the methanol was then removed by distillation. To the solution was added 350 ml. of ether. The ethereal solution was washed with 50 ml. of water. The ether solution was dried over anhydrous potassium carbonate. The solvent was removed by distillation, and fractionated through a 6" Vigreux column; yield 46.5 g. (86%), B.P. 96° C./0.07 mm., $N^{20}_D$ 1.5521.

Analysis calcd. for $C_{10}H_{14}N_2$: N, 17.26. Found: N, 16.86 From the highboiling residue, benzylacetone azine was obtained. B.P. 160° C./0.015 mm., $N^{20}_D$ 1.5616.

Analysis calcd. for $C_{20}H_{42}N_8$: N, 4.79. Found: N, 4.74.

*Example 16.—1-phenyl-3-hydrazino butane*

In 250 ml. of ethanol was dissolved 52.2 g. of benzylacetone hydrazone (0.322 mole). The hydrazone was neutralized with 19.3 g. of acetic acid (0.322 mole), transferred to a Parr bottle and 500 mg. of platinum oxide catalyst was added. The mixture was reduced at room temperature and 60 p.s.i. of hydrogen. The catalyst was removed by filtration, and the alcohol by distillation. Water was added to the residue which was made alkaline with solid potassium hydroxide. The alkaline mixture was extracted with ether and dried over anhydrous potassium carbonate. The solvent was removed by distillation and fractionated through a 2" Vigreux column; yield 36.4 g. (69%), B.P. 82° C./0.025 mm., $N^{20}_D$ 1.5333.

Analysis calcd. for $C_{10}H_{16}N_2$: N, 17.06. Found: N, 16.36. During distillation of this base a highboiling fraction was obtained consisting of N,N'-bis-[(4-phenyl)-2-butyl]hydrazine, B.P. 150 C./0.02 mm., $N^{20}_D$ 1.5455.

Analysis calcd. for $C_{20}H_{28}N_2$: N, 9.46. Found: N, 9.26.

*Example 17.—1-phenyl-3-hydrazino butane sulfate*

In 500 ml. of isopropanol was dissolved 30.9 g. of base from Example 16. A solution of 20 g. of sulfuric acid was added in 80 ml. of water. The solvents were removed by distillation in vacuo, and a syrup remained. The mass was dissolved in 400 ml. of hot isopropanol, cooled, 1000 ml. of dry ether added and crystallization induced by seeding. The precipitate was removed by filtration and dried; yield 38.5 g., M.P. 92° C. The salt could be recrystallized from 10 fold amount of acetonitrile or a 15 fold amount of ethyl acetate; M.P. 96° C.

Analysis calcd. for $C_{10}H_{18}N_2O_4S$: N, 10.86. Found: 11.01. Sulfuric acid: 37.37. Found: 37.82.

*Example 18.—1-(3'-chlorophenyl)-2-hydrazinopropane*

A solution of 42.5 g. of 3-chlorophenyl acetone (0.252 mole) in 400 ml. of methanol was added in 6 hours to a stirred refluxing solution of 45.5 g. of hydrazine hydrate (85%) in 600 ml. of methanol. The solution was stirred and refluxed for 2 more hours. The methanol was removed by distillation, the remaining portion was extracted with ether, and washed with 50 ml. of water. The ethereal extracts were dried over anhydrous potassium carbonate. The solvent was removed by distillation; residue, 45.4 g. The residue was dissolved in 225 ml. of ethanol, transferred to a Parr bottle, 14.8 g. of acetic acid added and was followed by 750 mg. of platinum oxide catalyst. The mixture was reduced at 60 p.s.i. of hydrogen. The catalyst was removed by filtration, and the alcohol by distillation. Water was added to the residue which was then made strongly alkaline and extracted with ether. The ethereal extracts were dried over anhydrous potassium carbonate. The solvent was removed by distillation and the remaining portion fractionated through a 4" Vigreux column; yield 20.0 g. (43%), B.P. 86° C./0.1 mm., $N^{20}_D$ 1.5522.

Analysis calcd. for $C_9H_{14}ClN_2$: N, 15.09; Cl, 19.09. Found: N, 12.66; Cl, 19.23. The compound lost nitrogen on standing at room temperature.

*Example 19.—1-(3'-chlorophenyl)-2-hydrazinopropane phosphate*

In 250 ml. of ethanol was dissolved 21 g. of the base from Example 18. The mixture was heated to boiling and added to a solution of 13.2 g. of phosphoric acid (85%) in 100 ml. of ethanol. The mixture was cooled, filtered, rinsed with ethanol, and dried; yield 30 g., starts to shrink at ca. 125° C., melts and decomposes ca. 265° C.

Analysis calcd. for $C_9H_{17}ClN_2O_4P$: N, 9.88; phosphoric acid, 34.55. Found: N, 9.92; phosphoric acid, 34.62.

*Example 20.—1-(4'-methoxyphenyl)-2-propylidenyl hydrazine*

To a solution of 51 g. of hydrazine hydrate (85%) (0.87 mole) in 125 ml. of methanol was added with stirring at 10–20° C. in 2 hours a solution of 71.5 g. of 4-methoxyphenylacetone (0.435 mole) in 100 ml. of methanol. The solution was stirred for 3 hours at room temperature. The methanol was removed by distillation, and 300 ml. of ether added. The aqueous hydrazine layer was separated and extracted again with ether. The combined ethereal extracts were dried over potassium carbonate. The solvent was removed by distillation and the remaining portion fractionated through a 4" Vigreux column; yield 44.6 g. (57.6%), B.P. 124° C./0.015 mm., $N^{20}_D$ 1.5615.

Analysis calcd. for $C_{10}H_{14}ON_2$: N, 15.72. Found: N, 15.22.

*Example 21.—1-(4'-methoxyphenyl)-2-propyl hydrazine*

In 200 ml. of ethanol was dissolved 39.2 g. of 2-(4'-methoxy)-phenylisopropylidenyl hydrazine (0.22 mole). The base was neutralized with 13.2 g. of acetic acid (0.22 mole), transferred to a Parr bottle and 400 mg. of platinum oxide catalyst was added. Reduction proceeded rapidly at room temperature and 60 p.s.i. of hydrogen pressure. The catalyst was removed by filtration and the alcohol by distillation. Water was added to the residue and made strongly alkaline with potassium hydroxide. The oil was extracted with ether and the extracts dried over anhydrous potassium carbonate. The solvent was removed by distillation, and the residue fractionated through a 4" Vigreux column; yield 23.4 g. (59.1%), B.P. 105° C./0.03 mm., $N^{20}_D$ 1.5403.

Analysis calcd. for $C_{10}H_{16}ON_2$: N, 15.56. Found: N, 15.36.

The hydrochloride salt was made by dissolving 20.2 g. of the base in a mixture of 200 ml. of dry ether and 200 ml. of isopropanol. Ethereal HCl was added until pH 3. On cooling, the hydrochloride crystallized out; yield 18.6 g., M.P. 130–131° C. The salt can be recrystallized from a 10 fold amount of acetonitrile.

Analysis calcd. for $C_{10}H_{17}ON_2Cl$: N, 6.46; Cl, 16.36. Found: N, 6.57; Cl, 16.56.

*Example 22.—2-methylphenyl acetone hydrazone*

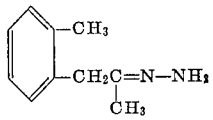

A solution of 49.3 g. of 2-methylphenyl acetone (0.33 mole) in 200 ml. of methanol was added with stirring at ca. 20° C. in 3 hours to a solution of 59 g. of hydrazine hydrate (85%) (1.0 mole) in 300 ml. of methanol. The solution was stirred for 2 more hours. The methanol was removed by distillation, and the residue extracted with ether. The ethereal extracts were dried over anhydrous potassium carbonate and the solvent was removed by distillation. The remaining portion was fractionated through a 10″ Vigreux column; yield 42.9 g. (79.3%), B.P. 93° C./0.04 mm., $N^{20}_D$ 1.5621.

Analysis calcd. for $C_{10}H_{14}N_2$: N, 8.69. Found: N, 8.50.

*Example 23.—1-(2'-methylphenyl)-2-hydrazino propane*

In 250 ml. of ethanol was dissolved 40.8 g. of 2-methylphenyl acetone hydrazone (0.252 mole). The hydrazone was neutralized with 15.1 g. of acetic acid (0.252 mole), transferred to a Parr bottle and 550 mg. of platinum oxide catalyst added. Reduction proceeded rapidly at room temperature and 60 p.s.i. of hydrogen pressure. The catalyst was removed by filtration, and the alcohol by distillation. Water was added to the residue and made strongly alkaline with potassium hydroxide. The residue was extracted with ether, and dried over anhydrous potassium carbonate. The solvent was removed by distillation and the residue fractionated through a 12″ Vigreux column; yield 15.9 g. (38.5%), B.P. 84.5° C./0.04 mm., $N^{20}_D$ 1.5399.

Analysis calcd. for $C_{10}H_{16}N_2$: N, 17.06. Found: N, 16.67.

The hydrochloride salt was made by dissolving 1.64 g. of the base (0.01 mole) in a mixture of 10 ml. of isopropanol and 20 ml. of dry ether. Added ethereal HCl until pH 5. On cooling the hydrochloride crystallized; yield 1.8 g., M.P. 122° C. The salt could be recrystallized from a 20 fold amount of hot acetonitrile. M.P. 127° C.

Analysis calcd. for $C_{10}H_{17}N_2Cl$: N, 13.96; Cl, 17.66. Found: N, 13.82; Cl, 17.97.

The phosphate salt was prepared from 0.82 g. of the base (0.005 mole); yield, 1.3 g., shrinking at ca. 150° C., no clear melt.

Analysis calcd. for $C_{10}H_{19}O_4N_2P$: N, 10.68; phosphoric acid, 37.38. Found: N, 10.49; phosphoric acid, 37.73.

*Example 24.—3',4'-dimethoxyphenyl acetone hydrazone*

The hydrazone was prepared as in Example 22 from the appropriate reactants, B.P. 147° C. (0.04 mm.).

Analysis calcd. for $C_{11}H_{16}N_2O_2$: N, 13.46. Found: N, 13.22.

*Example 25.—1-(3',4'-dimethoxyphenyl)-2-propyl hydrazine*

The hydrazone of Example 24 was reduced with platinum oxide and glacial acetic acid in ethanol as in Example 23, yield 45%, B.P. 132° C. (0.04 mm.). Nitrogen evolved on distillation.

Analysis calcd. for $C_{11}H_{18}N_2O_2$: N, 13.32. Found: N, 11.71.

The phosphate salt melted at ca. 150–160° C. dec.

Analysis calcd. for $C_{11}H_{21}N_2O_6P$: N, 9.08; phosphoric acid, 31.80. Found: N, 9.23; phosphoric acid, 34.92.

*Example 26.—3',4',5'-trimethoxyphenyl acetone hydrazone*

The hydrazone was prepared as in Example 22 from the appropriate reactants, B.P. 156° C. (0.05 mm.).

Analysis calcd. for $C_{12}H_{18}N_2O_3$: C, 72.92; H, 8.18; N, 11.76. Found: C, 72.98; H, 8.22; N, 11.44.

*Example 27.—1-(3',4',5'-trimethoxyphenyl)-2-propyl hydrazine*

The hydrazone of Example 26 was reduced with platinum oxide in ethanolic acetic acid as in Example 23; yield 54%, B.P. 142° C. (0.03 mm.), $N^{20}_D$ 1.5424.

Analysis calcd. for $C_{12}H_{20}N_2O_3$: N, 11.60. Found: N, 11.91.

The hydrochloride salt melted at 150° C.

Analysis calcd for $C_{12}H_{21}ClN_2O_3$: Cl, 12.81; N, 10.12. Found: Cl, 12.87; N, 10.35.

*Example 28.—4'-methoxyphenylbutanone hydrazone*

The hydrazone was prepared in 49% yield from the ketone and 85% hydrazine hydrate in methanol; B.P. 134° C. (0.10 mm.), $N^{20}_D$ 1.5510.

Analysis calcd. for $C_{11}H_{16}N_2O$: N, 14.56. Found: N, 13.32.

*Example 29.—1-(4'-methoxyphenyl)-3-butyl hydrazine*

The hydrazine of Example 28 was reduced with platinum oxide and glacial acetic acid in ethanol in the usual manner, B.P. 115° C. (0.15 mm.).

Analysis calcd. for $C_{11}H_{18}N_2O$: N, 14.42. Found: N, 14.43.

The sulfate salt melted at 104–105° C.

Analysis calcd. for $C_{11}H_{20}N_2O_5S$: N, 9.58; $H_2SO_4$, 33.55. Found: N, 9.54; $H_2SO_4$, 33.79.

*Example 30.—4'-isopropylphenyl acetone hydrazone*

This compound was prepared from isopropylphenyl acetone and hydrazine hydrate as in the previous examples, B.P. 117° C. (0.12 mm.).

Analysis calcd. for $C_{12}H_{18}N_2$: N, 14.72. Found: N, 14.70.

*Example 31.—1-(4'-isopropylphenyl)-2-hydrazinopropane*

The hydrazone of Example 30 was reduced with hydrogen using platinum oxide and glacial acetic acid in ethanol, B.P. 90° C. (0.1 mm.).

Analysis calcd. for $C_{12}H_{20}N_2$: N, 14.56. Found: N, 14.32.

The phosphate salt melted at ca. 158° C.

Analysis calcd. for $C_{12}H_{20}N_2 \cdot H_3PO_4$: N, 9.65; $H_3PO_4$, 32.93. Found: N, 9.88; $H_3PO_4$, 33.10.

For the preparation of the intermediate ketones (1-aryl-2-propanones) the method of H. B. Hass, A. Susie and R. Heider (J. Org. Chem., 15, 8 (1950) was followed. Ketones not mentioned in the literature which were prepared are:

1-(3',4'-methylenedioxy)-phenyl-2-propanone, B.P. 80° C. (0.08 mm.), $N^{20}_D$ 1.5420.

Analysis calcd. for $C_{10}H_{11}O_3$: CO, 15.74. Found: CO, 15.19.

1-(3',4',5'-trimethoxy)-phenyl-2-propanone, B.P. 130° C. (0.03 mm.), M.P. 67–68° C. $N^{20}_D$ 1.5319.

Analysis calcd. for $C_{12}H_{16}O_4$: CO, 12.49. Found: CO, 12.27.

1-(3'-chloro)-phenyl-2-propanone, B.P. 75° C. (0.06 mm.), $N^{20}_D$ 1.5350.

Analysis calcd. for $C_9H_9ClO$: Cl, 21.03. Found: Cl, 20.73.

Various changes and modifications of the invention can be made and, to the extent that such variations incorporate the spirit of this invention, they are intended to be included within the scope of the appended claims.

What is claimed is:
1. A unit dosage pharmaceutical composition comprising a pharmaceutical carrier and 1 to 50 mg. of a member of the group consisting of compounds of the formula

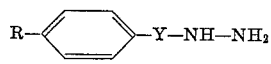

and nontoxic acid addition salts thereof in which R is a member of the group consisting of hydrogen and methoxy, and Y is a straight or branched alkylene of 2 to 5 carbon atoms in which at least two carbons are in a straight line between the phenyl and hydrazine group.

2. A composition of claim 1 in which R is hydrogen and Y is isopropylene.

References Cited

UNITED STATES PATENTS

| | | | |
|---|---|---|---|
| 2,383,134 | 8/1945 | Lacey et al. | 260—569 |
| 2,688,040 | 8/1954 | Adams et al. | 260—569 |
| 2,784,141 | 3/1957 | Jacobsen | 167—65 |
| 2,804,422 | 8/1957 | Schumann | 167—65 |
| 3,000,903 | 9/1961 | Biel | 260—340.5 |
| 3,213,138 | 10/1965 | Biel | 260—569 |

SAM ROSEN, *Primary Examiner.*

MORRIS WOLK, WILLIAM B. KNIGHT, JULIAN S. LEVITT, *Examiners.*

J. S. SAXE, *Assistant Examiner.*